United States Patent
Langenfeld et al.

(10) Patent No.: US 9,758,228 B1
(45) Date of Patent: Sep. 12, 2017

(54) EXHAUST MANIFOLDS FOR OUTBOARD MARINE ENGINES

(71) Applicant: Brunswick Corporation, Lake Forest, IL (US)

(72) Inventors: Gregg D. Langenfeld, Fond du Lac, WI (US); Steven W. Habeck, Oshkosh, WI (US); Jeffrey J. Broman, Slinger, WI (US); Ryan E. Mueller, Ripon, WI (US); David J. Hilbert, Black Creek, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 15/200,437

(22) Filed: Jul. 1, 2016

(51) Int. Cl.
| | |
|---|---|
| *B63H 20/24* | (2006.01) |
| *B63H 20/28* | (2006.01) |
| *B63H 21/32* | (2006.01) |
| *F02B 61/04* | (2006.01) |
| *F01N 13/10* | (2010.01) |
| *F01N 13/00* | (2010.01) |
| *F01N 3/10* | (2006.01) |
| *F01N 3/04* | (2006.01) |

(52) U.S. Cl.
CPC .......... *B63H 20/245* (2013.01); *B63H 20/24* (2013.01); *B63H 20/28* (2013.01); *B63H 21/32* (2013.01); *F01N 3/046* (2013.01); *F01N 3/10* (2013.01); *F01N 13/004* (2013.01); *F01N 13/10* (2013.01); *F02B 61/045* (2013.01)

(58) Field of Classification Search
CPC ........ B63H 20/00; B63H 20/24; B63H 20/28; B63H 20/32

USPC .............................................. 440/89 H, 89 R
See application file for complete search history.

(56) References Cited

U.S. PATENT DOCUMENTS

| | | | |
|---|---|---|---|
| 1,862,723 A | 6/1932 | Summers | |
| 2,305,295 A | 10/1940 | Lang et al. | |
| 2,318,006 A | 5/1943 | Mercier | |
| 2,388,924 A | 11/1945 | Mercier | |
| 3,768,248 A | 10/1973 | Grgurich et al. | |
| 3,898,802 A | 8/1975 | Tadokoro et al. | |
| 3,994,129 A | 11/1976 | Sakurai et al. | |

(Continued)

FOREIGN PATENT DOCUMENTS

| | | |
|---|---|---|
| CA | 1285883 | 7/1991 |
| DE | 664031 | 10/1938 |

(Continued)

OTHER PUBLICATIONS

Mercury Marine Service Manual: Models 175XR2 Sport Jet. Mercury Marine; Nov. 1997.

*Primary Examiner* — Lars A Olson
(74) *Attorney, Agent, or Firm* — Andrus Intellectual Property Law, LLP

(57) ABSTRACT

An exhaust manifold is for an internal combustion engine on an outboard marine engine that is configured to power a propulsor to provide a thrust in a longitudinal direction. The exhaust manifold comprises an exhaust runner that transversely and longitudinally rearwardly conveys the exhaust gas from the internal combustion engine, an exhaust log that vertically upwardly conveys the exhaust gas from the exhaust runner, and an exhaust elbow that conveys the exhaust gas from the exhaust log vertically upwardly, longitudinally forwardly, and then vertically downwardly.

18 Claims, 6 Drawing Sheets

(56) References Cited

U.S. PATENT DOCUMENTS

| | | | |
|---|---|---|---|
| 4,082,068 A | 4/1978 | Hale | |
| 4,188,784 A | 2/1980 | Hall | |
| 4,346,676 A | 8/1982 | Tyner | |
| 4,932,367 A | 6/1990 | Newman et al. | |
| 4,965,997 A | 10/1990 | Suzuki et al. | |
| 5,003,934 A | 4/1991 | Gubon et al. | |
| 5,012,648 A | 5/1991 | Okumura | |
| 5,337,706 A | 8/1994 | De Blasis | |
| 5,346,417 A | 9/1994 | Isogawa | |
| 5,374,209 A | 12/1994 | Wagner | |
| 5,378,180 A | 1/1995 | Nakayama et al. | |
| 5,463,990 A | 11/1995 | Rush, II et al. | |
| 5,476,402 A | 12/1995 | Nakai et al. | |
| 5,494,467 A | 2/1996 | Sohgawa et al. | |
| 5,513,606 A | 5/1996 | Shibata | |
| 5,553,586 A | 9/1996 | Koishikawa et al. | |
| 5,556,311 A | 9/1996 | Fujimoto | |
| 5,673,655 A | 10/1997 | Mishima | |
| 5,762,051 A | 6/1998 | Okamoto | |
| 5,778,833 A | 7/1998 | Kuranishi | |
| 5,778,847 A | 7/1998 | Takahashi et al. | |
| 5,822,985 A | 10/1998 | Yoshimura | |
| 5,822,986 A | 10/1998 | Higashide | |
| 5,855,495 A | 1/1999 | Kubo | |
| 5,881,553 A | 3/1999 | Steenackers et al. | |
| 5,887,907 A | 3/1999 | Kubota et al. | |
| 5,893,783 A | 4/1999 | Hiraoka et al. | |
| 5,911,605 A | 6/1999 | Wooldridge et al. | |
| 5,911,608 A | 6/1999 | Nakayama et al. | |
| 6,053,786 A | 4/2000 | Mishima et al. | |
| 6,213,074 B1 | 4/2001 | Freese | |
| 6,298,815 B1 | 10/2001 | Kashima et al. | |
| 6,302,754 B1 | 10/2001 | Kashima | |
| 6,338,660 B1 | 1/2002 | Fukuda | |
| 6,543,429 B2 | 4/2003 | Suzuki et al. | |
| 6,622,481 B1 | 9/2003 | Ruman et al. | |
| 6,662,555 B1 | 12/2003 | Ishii | |
| 6,722,126 B2 | 4/2004 | Kawamizu | |
| 7,043,915 B2 | 5/2006 | Anello | |
| 7,115,009 B2 | 10/2006 | Itoh et al. | |
| 7,162,985 B2 | 1/2007 | Itoh et al. | |
| 7,214,110 B1 | 5/2007 | Ehlers et al. | |
| 7,361,067 B1 | 4/2008 | Smedema | |
| 7,377,251 B2 | 5/2008 | Wizgall et al. | |
| 7,451,734 B2 | 11/2008 | Weber | |
| 7,704,111 B2 | 4/2010 | Ito et al. | |
| 7,731,241 B2 | 6/2010 | Aoki et al. | |
| 7,837,233 B2 | 11/2010 | Johnston et al. | |
| 7,867,048 B2 | 1/2011 | Ochiai | |
| 7,895,992 B2 | 3/2011 | Diggs et al. | |
| 7,930,883 B2 | 4/2011 | Konakawa et al. | |
| 7,954,314 B1 | 6/2011 | Bruestle et al. | |
| 8,002,597 B2 | 8/2011 | Ochiai | |
| 8,266,906 B2 | 9/2012 | Wu et al. | |
| 8,366,501 B2 | 2/2013 | Kazuta | |
| 8,668,538 B1 | 3/2014 | Langenfeld et al. | |
| 8,801,482 B2 | 8/2014 | Ochiai et al. | |
| 8,858,283 B2 | 10/2014 | Ochiai et al. | |
| 8,978,372 B2 | 3/2015 | Ochiai et al. | |
| 9,120,549 B2 | 9/2015 | Ochiai et al. | |
| 9,174,818 B1 | 11/2015 | Langenfeld et al. | |
| 9,359,058 B1 * | 6/2016 | Langenfeld et al. | B63H 20/24 |
| 2002/0017252 A1 | 2/2002 | Onoue | |
| 2003/0051683 A1 | 3/2003 | Okamoto | |
| 2004/0142612 A1 | 7/2004 | Tawa et al. | |
| 2004/0203299 A1 | 10/2004 | Kashima et al. | |
| 2005/0263123 A1 | 12/2005 | Itoh et al. | |
| 2006/0144369 A1 | 7/2006 | Takahashi et al. | |
| 2007/0056281 A1 | 3/2007 | Arvan et al. | |
| 2009/0007550 A1 | 1/2009 | Konakawa et al. | |
| 2009/0078240 A1 | 3/2009 | Diggs et al. | |
| 2009/0094965 A1 | 4/2009 | Takewaki | |
| 2009/0215333 A1 | 8/2009 | Ochiai | |
| 2010/0130079 A1 | 5/2010 | White et al. | |
| 2010/0240269 A1 | 9/2010 | Ochiai | |
| 2010/0242450 A1 | 9/2010 | Werni et al. | |
| 2011/0223819 A1 | 9/2011 | Kazuta | |
| 2013/0130577 A1 | 5/2013 | Ochiai et al. | |
| 2013/0210295 A1 | 8/2013 | Davis et al. | |

FOREIGN PATENT DOCUMENTS

| | | |
|---|---|---|
| DE | 2344864 | 4/1975 |
| DE | 2449753 | 4/1976 |
| DE | 3150001 | 6/1983 |
| DE | 3631312 | 7/1987 |
| DE | 4030652 | 4/1992 |
| DE | 4042415 | 11/1992 |
| DE | 4136799 | 5/1993 |
| DE | 19736500 | 12/1998 |
| DE | 69823516 | 4/2005 |
| DE | 202005019046 | 3/2006 |
| DE | 102004060845 | 6/2006 |
| DE | 102006043864 | 6/2007 |
| DE | 202008010025 | 11/2008 |
| DE | 102010034953 | 6/2011 |
| DE | 102011001195 | 9/2011 |
| DE | 102010015679 | 10/2011 |
| EP | 0685637 | 12/1999 |
| EP | 1069301 | 1/2001 |
| FR | 651848 | 2/1929 |
| GB | 436 058 | 10/1935 |
| GB | 518518 | 2/1940 |
| GB | 674532 | 6/1952 |
| GB | 915230 | 1/1963 |
| JP | 5699005 | 12/1954 |
| JP | 55010043 | 1/1980 |
| JP | 36-146876 | 5/1994 |
| JP | 06146876 | 5/1994 |
| JP | 36-264757 | 9/1994 |
| JP | 1994264757 | 9/1994 |
| JP | 1997317464 | 12/1997 |
| JP | 2000356123 | 12/2000 |
| JP | 2001140636 | 5/2001 |
| JP | 200297948 | 4/2002 |
| JP | 2003286842 | 10/2003 |
| JP | 200460557 | 2/2004 |
| JP | 2004293404 | 10/2004 |
| JP | 2005188351 | 7/2005 |
| JP | 2005188352 | 7/2005 |
| JP | 2006170020 | 6/2006 |
| JP | 2008031868 | 2/2008 |
| JP | 2008031897 | 2/2008 |
| JP | 2008031898 | 2/2008 |
| JP | 2009002265 | 1/2009 |
| JP | 4329396 | 9/2009 |
| JP | 2010242744 | 10/2010 |
| JP | 2011190704 | 9/2011 |
| JP | 2011202578 | 10/2011 |
| NO | 1989004421 | 5/1989 |

* cited by examiner

US 9,758,228 B1

EXHAUST MANIFOLDS FOR OUTBOARD MARINE ENGINES

FIELD

The present disclosure relates to marine drives and particularly to exhaust manifolds for outboard marine engines.

BACKGROUND

U.S. Pat. No. 9,174,818 is hereby incorporated herein by reference and discloses a marine engine having a cylinder block with first and second banks of cylinders that are disposed along a longitudinal axis and extend transversely with respect to each other in a V-shape so as to define a valley there between. A catalyst receptacle is at least partially disposed in the valley and contains at least one catalyst that treats exhaust gas from the marine engine. An exhaust conduit conveys the exhaust gas from the marine engine to the catalyst receptacle. The exhaust conduit receives the exhaust gas from the first and second banks of cylinders and conveys the exhaust gas to the catalyst receptacle. The conduit reverses direction only once with respect to the longitudinal axis.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, an outboard marine engine extends from a top side to a bottom side in a vertical direction, from a port side to a starboard side in a transverse direction that is perpendicular to the vertical direction, and from a forward side to an aftward side in a longitudinal direction that is perpendicular to the vertical direction and perpendicular to the transverse direction. The outboard marine engine comprises an internal combustion engine configured to power a propulsor to provide a propulsive thrust in the longitudinal direction. An exhaust manifold is configured to convey exhaust gas from the internal combustion engine. The exhaust manifold comprises an exhaust runner that transversely and longitudinally rearwardly conveys the exhaust gas from the internal combustion engine, an exhaust log that vertically upwardly conveys the exhaust gas from the exhaust runner, and an exhaust elbow that conveys the exhaust gas from the exhaust log vertically upwardly, longitudinally forwardly, and then vertically downwardly.

BRIEF DESCRIPTION OF THE DRAWINGS

The present disclosure is described with reference to the following figures. The same numbers are used throughout the figures to reference like features and like components.

DETAILED DESCRIPTION OF THE DRAWINGS

Figure 1:
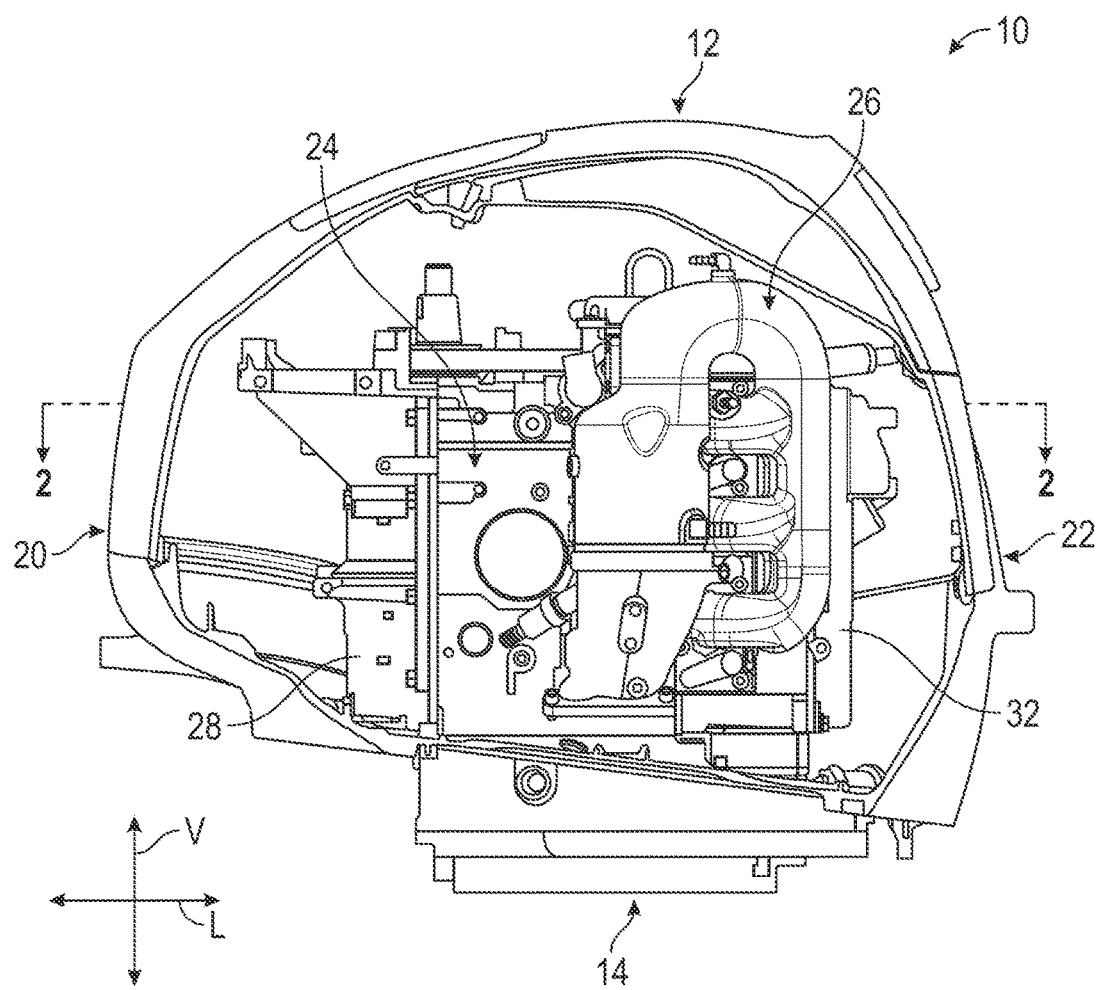
FIG. 1 is a side view of an outboard marine engine with a side portion of the cowling not shown.

In the present description, certain terms have been used for brevity, clarity and understanding. No unnecessary limitations are to be inferred therefrom beyond the requirement of the prior art because such terms are used for descriptive purposes only and are intended to be broadly construed.

FIGS. 1-3B depict an outboard marine engine 10 for propelling a marine vessel in water. The outboard marine engine 10 extends from a top side 12 to a bottom side 14 in a vertical direction V, from a starboard side 16 to a port side 18 in a transverse direction T that is perpendicular to the vertical direction V, and from a forward side 20 to an aftward side 22 in a longitudinal direction L that is perpendicular to the vertical direction V and perpendicular to the transverse direction T. As is conventional, the outboard marine engine 10 includes an internal combustion engine 24 that is configured to power a propulsor (not shown) to provide a propulsive thrust in the longitudinal direction L for propelling the noted marine vessel in water.

The internal combustion engine 24 includes a crank case 28, a cylinder block 30, a cylinder head 31, and a valve cover 32. An exhaust manifold 26 is bolted on to the internal combustion engine 24 and is configured to convey exhaust gas away from the internal combustion engine 24. As further explained herein below, the exhaust manifold 26 is configured to convey the exhaust gas away from the cylinder block 30 and cylinder head 31 and longitudinally, rearwardly towards the valve cover 32.

Referring to FIGS. 4A-4F, the exhaust manifold 26 includes a plurality of exhaust runners 34 that transversely and longitudinally convey the exhaust gas from the internal combustion engine 24, an exhaust log 36 that vertically upwardly conveys the exhaust gas from the exhaust runners 34, and an exhaust elbow 38 that vertically downwardly conveys the exhaust gas from the exhaust log 36.

Figure 2:
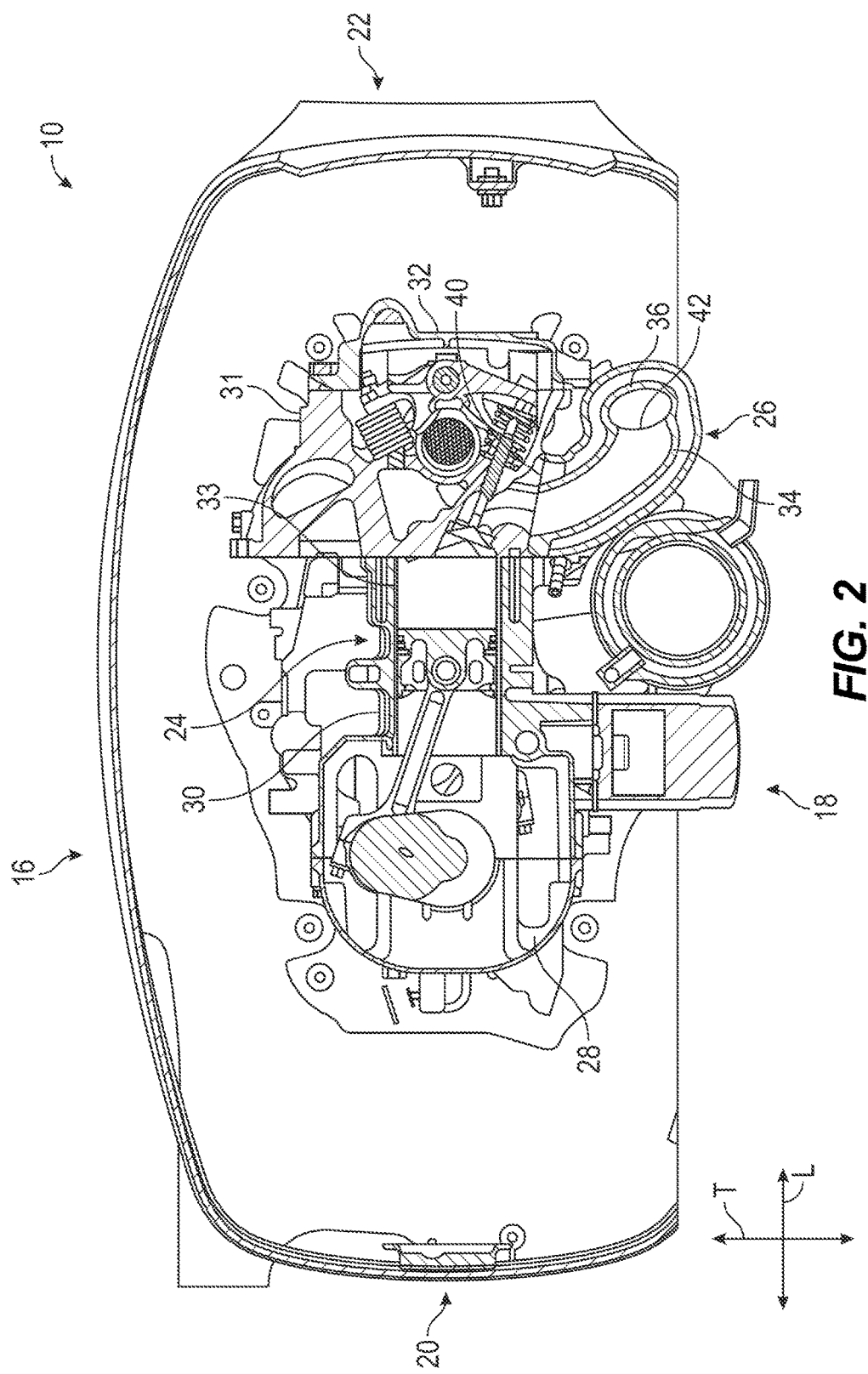
FIG. 2 is a view of section 2-2 taken in FIG. 1.
Figure 3A:
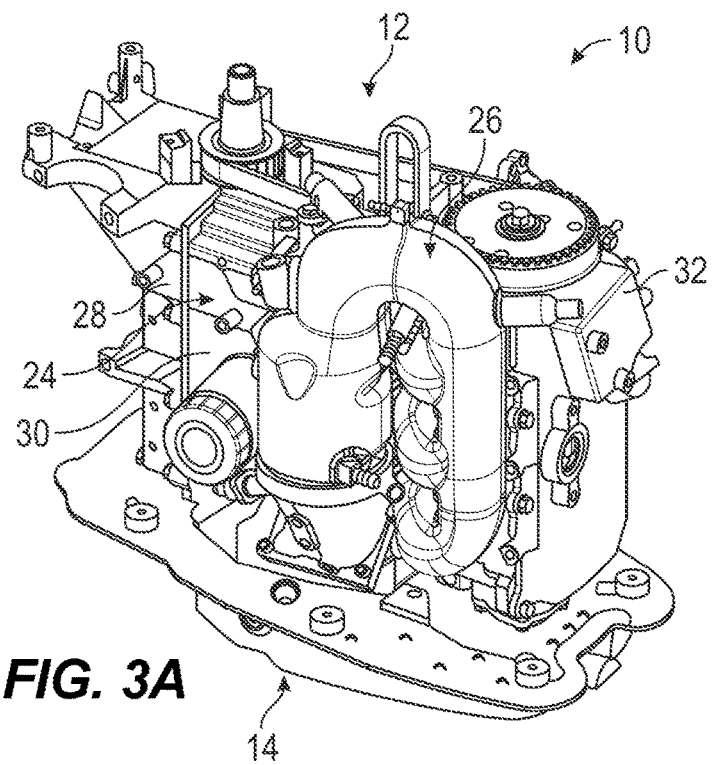
FIGS. 3A and 3B are perspective views of the outboard marine engine with the cowling and certain components removed.
Figure 3B:
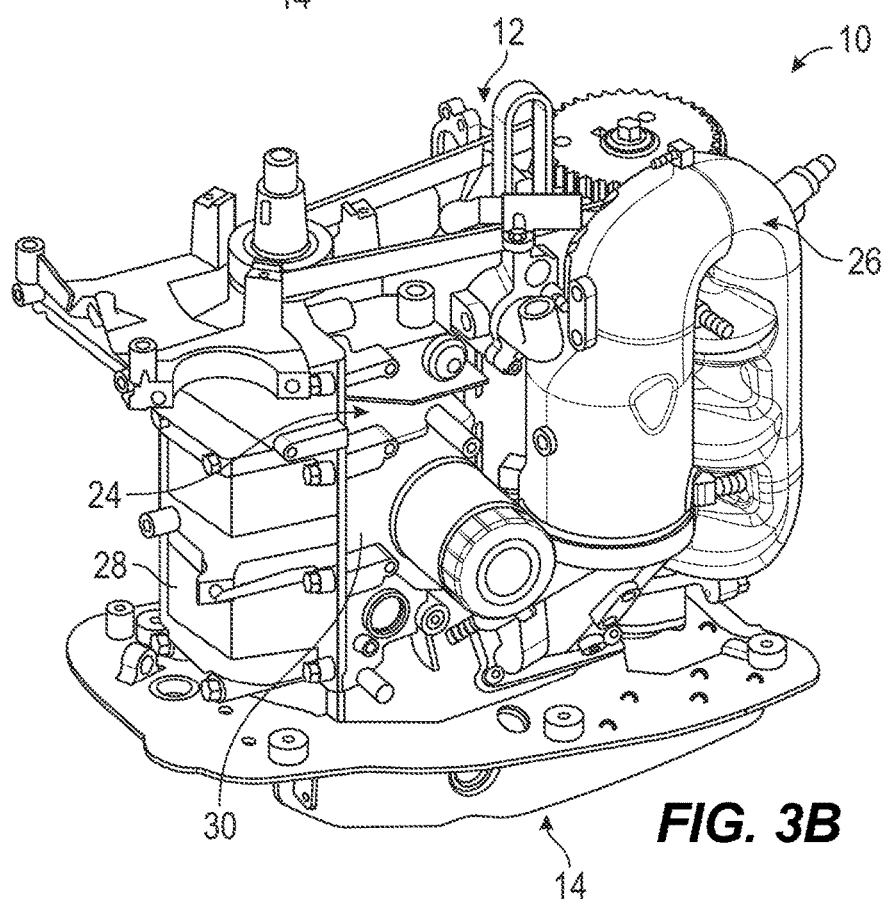

The number of exhaust runners 34 can vary from that which is shown, and typically will depend upon the number of corresponding piston-cylinders in the internal combustion engine 24. In the example shown, three exhaust runners 34 are coupled to three corresponding piston-cylinders 33 (see FIG. 2) of the internal combustion engine 24. Referring to FIG. 2, each exhaust runner 34 includes an upstream inlet 40 that transversely conveys the exhaust gas from the internal combustion engine 24 and a downstream outlet 42 that longitudinally conveys the exhaust gas from the upstream inlet 40 to the exhaust log 36. Each exhaust runner 34 is curved between the upstream inlet 40 and downstream outlet 42. From the upstream inlet 40 to the downstream outlet 42, each exhaust runner 34 initially extends generally transversely, then curves until it extends generally longitudinally. The downstream outlet 42 of each exhaust runner 34 is connected to the exhaust log 36 which extends vertically. Thus, the exhaust gas flows longitudinally from the exhaust runners 34 and then vertically, upwardly through the exhaust log 36.

Figure 4A:
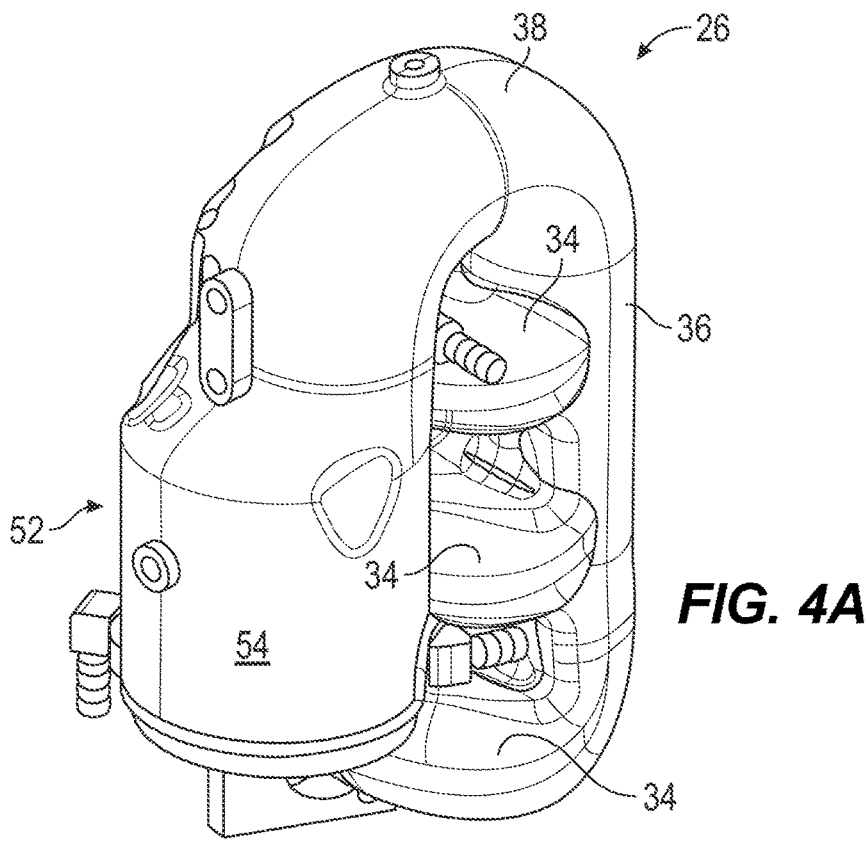
FIGS. 4A-4F are isometric and sectional views of an exemplary exhaust manifold according to the present disclosure.
Figure 4B:
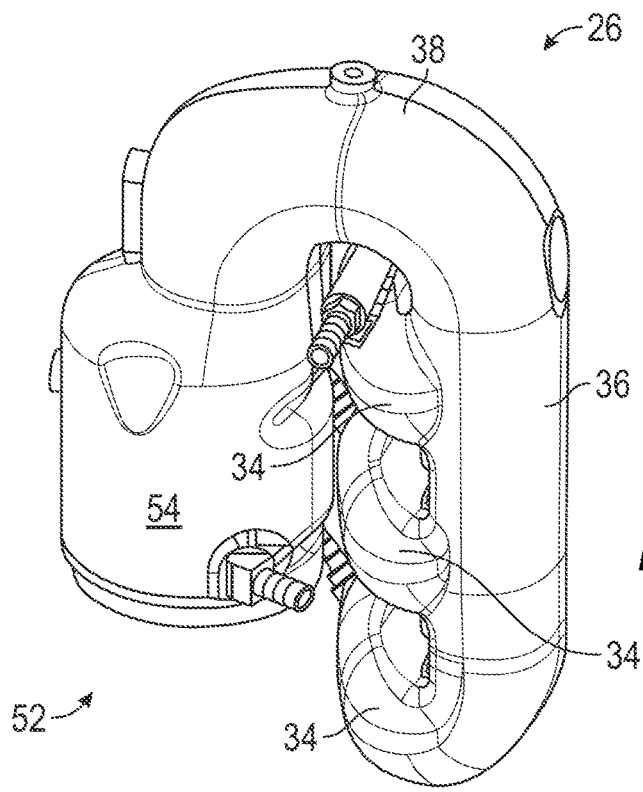
Figure 4C:
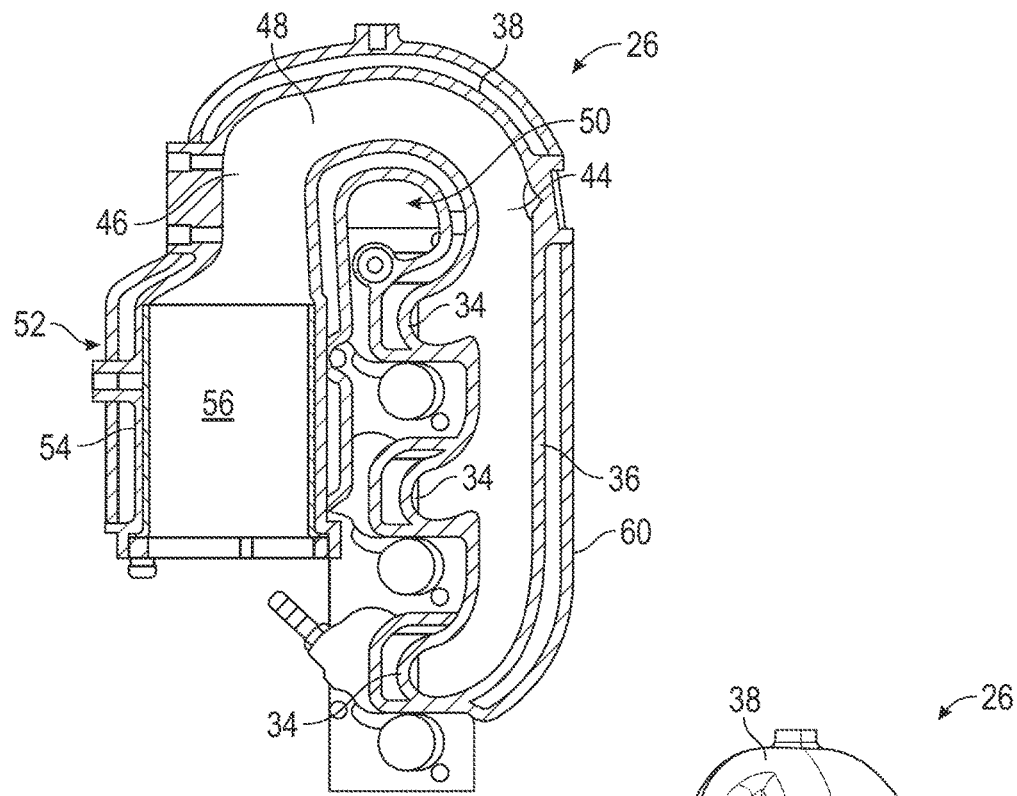
Figure 4D:
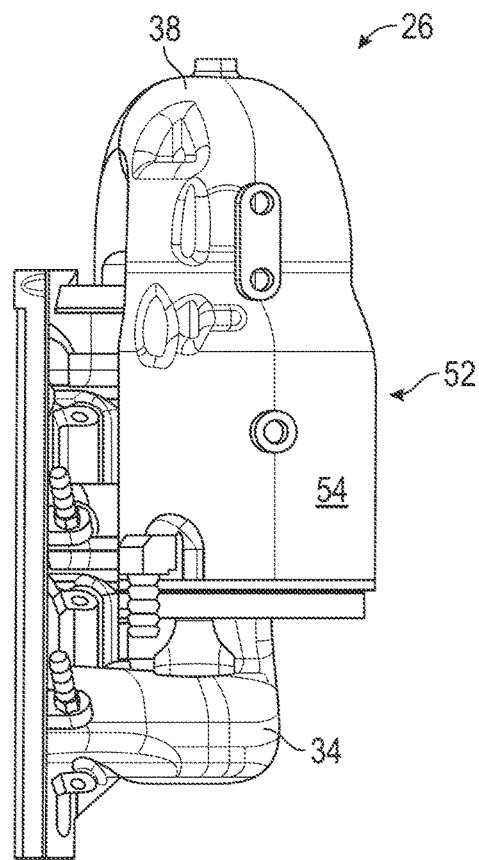

Referring to FIG. 4C, the exhaust elbow 38 includes an inlet end 44 that vertically upwardly conveys the exhaust gas from the exhaust log 36, an outlet end 46 that vertically downwardly conveys the exhaust gas, and a curved intermediate section 48 that re-routes the exhaust gas from a vertically upward flow to a vertically downward flow. A generous space or gap 50 is formed between the inlet end 44, curved intermediate section 48, and outlet end 46 so that the exhaust elbow 38 widely forms a smooth curved transition for more efficient flow of exhaust gas there along.

An exhaust conduit 52 is coupled to and vertically downwardly conveys the exhaust gas from the exhaust elbow 38. The type and configuration of the exhaust conduit 52 can vary from that which is shown. Optionally, the exhaust conduit 52 can include a catalyst housing 54 and a catalyst 56 (see FIG. 4C) disposed in the catalyst housing 54 for treatment of the exhaust gas, as is conventional.

Figure 4E:
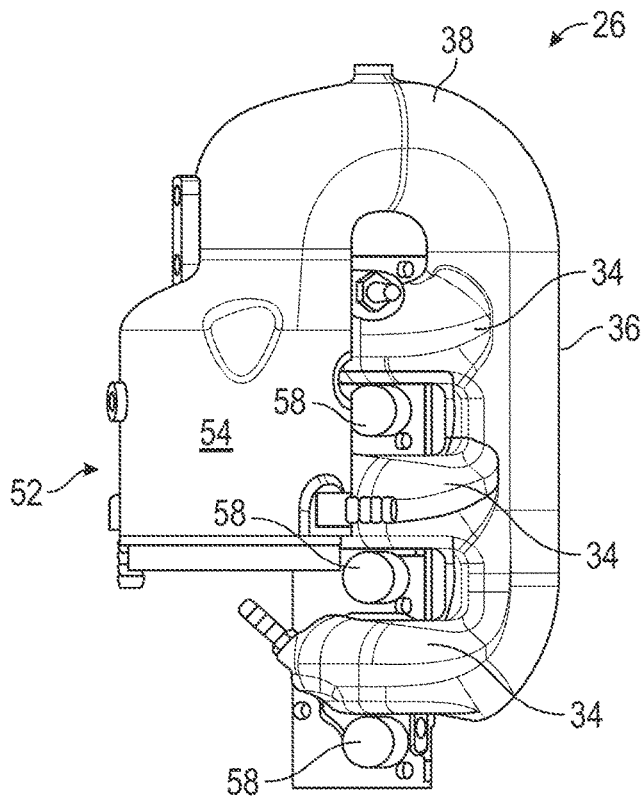
Figure 4F:
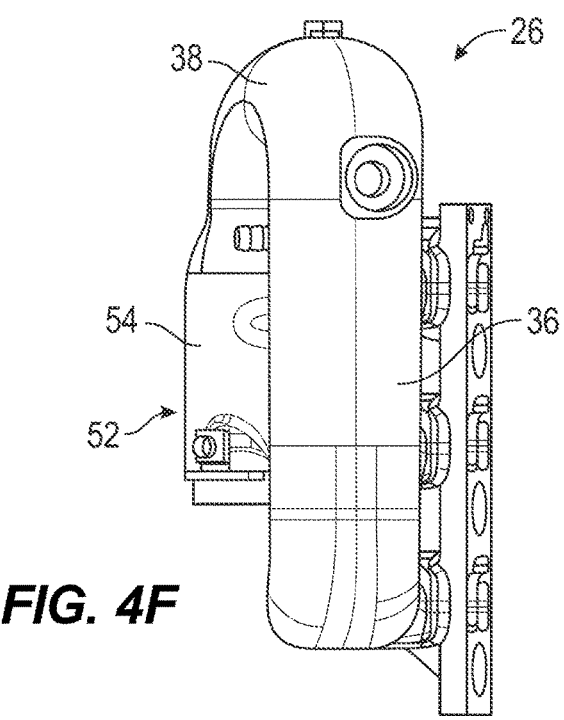

Referring to FIG. 4E, one or more generously-sized spaces or gaps 58 are formed between the internal combustion engine 24, the one or more exhaust runners 34 and the exhaust log 36. The gaps 58 efficiently provide manual access to a corresponding plurality of spark plugs on the internal combustion engine 24.

Optionally, a cooling jacket 60 (FIG. 4C) can be provided on all or portions of the exhaust manifold 26. The cooling jacket 60 can be configured to convey relatively cold cooling water alongside the exhaust manifold 26 for heat exchange with the exhaust gas flowing there through.

Through research and experimentation, the present inventors have found that the above described configuration for an outboard marine engine 10, including the unique exhaust manifold 26, provides a compact arrangement that accommodates tight packaging limitations without requiring relocation of surrounding equipment, such as oil filters and other similar devices. By re-routing the exhaust gas rearwardly, away from the cylinder block 30 and longitudinally towards the valve cover 32, respectively, the noted catalyst housing 54 can be placed in the same general area as prior art arrangements. Unlike the prior art, the exhaust manifold 26 conveys exhaust gas longitudinally, rearwardly and then vertically over the noted exhaust runners 34 to the vertically downwardly extending exhaust conduit 52 including the optional catalyst housing 54. The exhaust manifold 26 conveniently provides access to spark plugs on the internal combustion engine 24, longitudinally between the exhaust runners 34 and the exhaust log 36. Unjacketed portions of the exhaust manifold 26 can be implemented to provide better access to the noted spark plugs. The generous radius of the exhaust elbow 38 allow for minimal flow loss and an ability to develop the flow adequately to obtain sufficient make efficient use of the catalyst. This also provides functional and performance advantages over the prior art.

What is claimed is:

1. An outboard marine engine extending from a top side to a bottom side in a vertical direction, from a port side to a starboard side in a transverse direction that is perpendicular to the vertical direction, and from a forward side to an aftward side in a longitudinal direction that is perpendicular to the vertical direction and perpendicular to the transverse direction, the outboard marine engine comprising:
   an internal combustion engine configured to power a propulsor to provide a propulsive thrust in the longitudinal direction;
   an exhaust manifold configured to convey exhaust gas from the internal combustion engine, wherein the exhaust manifold comprises an exhaust runner that transversely and longitudinally rearwardly conveys the exhaust gas from the internal combustion engine, an exhaust log that vertically upwardly conveys the exhaust gas from the exhaust runner, and an exhaust elbow that conveys the exhaust gas from the exhaust log vertically upwardly, longitudinally forwardly, and then vertically downwardly.

2. The outboard marine engine according to claim 1, wherein the exhaust runner comprises an upstream inlet that transversely conveys the exhaust gas from the internal combustion engine and a downstream outlet that longitudinally rearwardly conveys the exhaust gas from the upstream inlet.

3. The outboard marine engine according to claim 2, wherein the exhaust runner is curved between the upstream inlet and downstream outlet.

4. The outboard marine engine according to claim 2, wherein from the upstream inlet of the exhaust runner to the downstream outlet of the exhaust runner, the exhaust runner initially extends transversely and then extends longitudinally rearwardly and further wherein the exhaust log extends vertically.

5. The outboard marine engine according to claim 1, further comprising an exhaust conduit that vertically downwardly conveys the exhaust gas from the exhaust elbow.

6. The outboard marine engine according to claim 5, wherein the exhaust conduit comprises a catalyst housing and further comprising a catalyst disposed in the catalyst housing.

7. The outboard marine engine according to claim 1, wherein the internal combustion engine comprises a plurality of piston-cylinders that are vertically aligned with each other.

8. The outboard marine engine according to claim 7, wherein the exhaust runner is one of a plurality of exhaust runners, each exhaust runner in the plurality of exhaust runners transversely and longitudinally rearwardly conveying the exhaust gas from the internal combustion engine.

9. The outboard marine engine according to claim 8, wherein the exhaust log vertically upwardly conveys the exhaust gas from the plurality of exhaust runners.

10. The outboard marine engine according to claim 9, wherein a plurality of gaps are formed between the internal combustion engine, the plurality of exhaust runners, and the exhaust log, and wherein the plurality of gaps provide manual access to a corresponding plurality of spark plugs on the internal combustion engine.

11. The outboard marine engine according to claim 1, wherein the exhaust elbow comprises an inlet end that vertically upwardly conveys the exhaust gas, an outlet end that vertically downwardly conveys the exhaust gas, and a curved intermediate section that re-routes the exhaust gas forwardly from vertically upwardly to vertically downwardly, wherein a gap is formed between the inlet end, curved intermediate section, and outlet end so that the exhaust elbow forms a smooth curved transition for flow of the exhaust gas there along.

12. The outboard marine engine according to claim 1, further comprising a cooling jacket on the exhaust manifold, wherein the cooling jacket is configured to convey cooling fluid alongside of the exhaust manifold.

13. The outboard marine engine according to claim 1, wherein the exhaust manifold is bolted onto the internal combustion engine.

14. The outboard marine engine according to claim 1, wherein the internal combustion engine comprises a crankcase, a cylinder block, a cylinder head and a valve cover, and wherein the exhaust runner transversely conveys the exhaust gas away from the cylinder head and cylinder block and longitudinally rearwardly towards the valve cover, respectively.

15. The outboard marine engine according to claim 14, further comprising spark plugs on the internal combustion engine longitudinally between the exhaust runner and the exhaust log.

16. The outboard marine engine according to claim 1, wherein the exhaust elbow conveys the exhaust gases vertically forwardly over the exhaust runner.

17. An exhaust manifold for an internal combustion engine on an outboard marine engine that is configured to power a propulsor to provide a thrust in the longitudinal direction, wherein the outboard marine engine extends from a top side to a bottom side in a vertical direction, from a port side to a starboard side in a transverse direction that is perpendicular to the vertical direction, and from a forward side to an aftward side in a longitudinal direction that is perpendicular to the vertical direction and perpendicular to the transverse direction, the exhaust manifold comprising an exhaust runner that transversely and longitudinally rearwardly conveys the exhaust gas from the internal combustion engine, an exhaust log that vertically upwardly conveys the exhaust gas from the exhaust runner, and an exhaust elbow that conveys the exhaust gas from the exhaust log vertically upwardly, longitudinally forwardly, and then vertically downwardly.

18. The exhaust manifold according to claim 1, wherein the exhaust elbow conveys the exhaust gases vertically forwardly over the exhaust runner.

* * * * *